United States Patent [19]

Yale

[11] Patent Number: 4,690,832

[45] Date of Patent: Sep. 1, 1987

[54] PROCESS FOR PROVIDING HYDROLYSIS RESISTANT PHOSPHORS

[75] Inventor: Ramon L. Yale, Ulster, Pa.

[73] Assignee: GTE Products Corporation, Stamford, Conn.

[21] Appl. No.: 939,654

[22] Filed: Dec. 9, 1986

Related U.S. Application Data

[62] Division of Ser. No. 729,374, May 1, 1985, abandoned.

[51] Int. Cl.$^4$ .................................................. C09K 11/475
[52] U.S. Cl. ............................... 427/65; 252/301.4 F; 252/301.4 S; 252/301.6 F; 252/301.6 S; 427/68; 427/219; 427/372.2; 428/404
[58] Field of Search ............... 252/301.4 F, 301.4 S, 252/301.6 F, 301.6 S; 428/404; 427/65, 68, 219, 372.2

[56] References Cited

U.S. PATENT DOCUMENTS

| | | | |
|---|---|---|---|
| 4,473,634 | 9/1984 | Dodds et al. ................. | 428/404 X |
| 4,544,605 | 10/1985 | Miyazaki et al. .................. | 428/404 |
| 4,624,861 | 11/1986 | Yale et al. .................. | 427/65 |

FOREIGN PATENT DOCUMENTS

| | | | |
|---|---|---|---|
| 47-13242 | 4/1972 | Japan ........................... | 252/301.4 S |
| 49-16689 | 2/1974 | Japan ........................... | 252/301.4 F |
| 49-21831 | 6/1974 | Japan ................................... | 428/404 |
| 52-63879 | 5/1977 | Japan ........................... | 252/301.4 F |
| 55-45597 | 11/1980 | Japan ........................... | 252/301.4 S |

*Primary Examiner*—Jack Cooper
*Attorney, Agent, or Firm*—Donald R. Castle

[57] ABSTRACT

A process is disclosed for making a rare earth oxysulfide phosphor resistant to hydrolysis. The process involves adding to a water slurry of the phosphor a sufficient amount of a source of silicon dioxide and a water soluble salt which can be an alkaline earth metal salt or a transition group IIB metal salt with agitation for a sufficient time to form a silicate coating on the phosphor with the cation of the water soluble salt becoming the cation of the silicate coating, the amount of the coating being sufficient to impart hydrolysis resistance thereto. The resulting silicate coated phosphor is then separated from the resulting liquor and heated at a sufficient temperature for a sufficient time in ambient atmosphere to remove essentially all of the water therefrom and to produce the final hydrolysis resistant phosphor.

A hydrolysis resistant rare earth oxysulfide phosphor is disclosed consisting essentially of a host which can be gadolinium oxysulfide, yttrium oxysulfide, gadolinium-yttrium oxysulfide, and lanthanum oxysulfide, from about 0.001 to about 0.10 moles of terbium per mole of host as an activator, and a sufficient amount of a silicate coating on the phosphor to impart hydrolysis resistance thereto.

11 Claims, No Drawings

PROCESS FOR PROVIDING HYDROLYSIS RESISTANT PHOSPHORS

This application is a division of application Ser. No. 729,374, filed 5/1/85, now abandoned.

BACKGROUND OF THE INVENTION

This invention relates to a process for making rare earth oxysulfide phosphors resistant to hydrolysis and to the hydrolysis resistant phosphors thus produced. More particularly it relates to a process for making rare earth oxysulfide phosphors resistant to hydrolysis by imparting a silicate coating thereon, and to the silicate coated hydrolysis resistant phosphor thus produced.

Rare earth oxysulfide phosphors have become successful x-ray intensifier phosphors. In this application the phosphor is on a screen called an intensifier screen. The screen is mounted in a cassette where in operation the phosphor thereon is exposed to x-rays. The phosphor converts the x-rays into visible or near visible radiation to which a photosensitive film is exposed resulting in an image being produced on the film.

One of the problems that has developed in the above application is that if the phosphor comes in contact with water, a hydrolytic reaction can occur and hydrogen sulfide is released. Additionally, if water is inadvertently dropped on an intensifying screen in an x-ray cassette and a film is placed in the cassette, a reaction between hydrogen sulfide and the silver halide in the film emulsion occurs. This reaction causes a brown stain on the intensifying screen that reduces the speed of the screen resulting in inferior radiographs.

Therefore, if the phosphors could be made resistant to hydrolysis so that they consistently produce good radiographs, it would be highly desirable and an advancement in the art.

SUMMARY OF THE INVENTION

In accordance with one aspect of this invention there is provided a process for making a rare earth oxysulfide phosphor resistant to hydrolysis. The process involves forming a slurry of the phosphor in water. To the slurry is added a sufficient amount of a source of silicon dioxide and a water soluble salt which can be an alkaline earth metal salt or a transition group IIB metal salt with agitation for a sufficient time to form a silicate coating on the phosphor with the cation of the water soluble salt becoming the cation of the silicate coating, the amount of the coating being sufficient to impart hydrolysis resistance to the phosphor. The resulting silicate coated phosphor is then separated from the resulting liquor and heated at a sufficient temperature for a sufficient time in an ambient atmosphere to remove essentially all of the water therefrom and to produce the final hydrolysis resistant phosphor.

In accordance with another aspect of this invention there is provided a hydrolysis resistant rare earth oxysulfide phosphor consisting essentially of a host which can be gadolinium oxysulfide, yttrium oxysulfide, gadolinium-yttrium oxysulfide, or lanthanum oxysulfide, from about 0.001 to about 0.10 moles of terbium per mole of host as an activator, and a sufficient amount of a silicate coating on the phosphor to impart hydrolysis resistance thereto.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

By the process of this invention, a terbium activated rare earth oxysulfide phosphor is made resistant to hydrolysis by coating the phosphor with a silicate.

The starting rare earth oxysulfide phosphor to be made hydrolysis resistant consists essentially of a host which is preferably gadolinium oxysulfide, yttrium oxysulfide, gadolinium-yttrium oxysulfide, and lanthanum oxysulfide, and from about 0.001 moles to about 0.10 moles, and preferably from about 0.001 moles to about 0.006 moles of terbium per mole of the host as an activator. The starting phosphor can be made by any well known solid state sintering technique.

A slurry is first formed of the phosphor in water, preferably deionized water. Generally from about 1 to about 10 weight parts of water are used per part of the starting phosphor.

To the slurry is added a sufficient amount of a source of silicon dioxide and a water soluble salt which can be an alkaline earth metal salt or a transition group IIB metal salt, with agitation for a period of time, preferably from about 5 minutes to about 15 minutes to form a silicate coating on the phosphor. The amount of the coating is sufficient to impart hydrolysis resistance to the phosphor.

The source of silicon dioxide can be any source which will react with the soluble metal salt to form the silicate coating provided it is of sufficient purity so that the final coated phosphor is not contaminated. The preferred source of silicon dioxide is relatively pure potassium silicate. Especially preferred is potassium silicate supplied by the Chemical and Metallurgical Division of GTE Products Corporation under the name of PS-6 which is an aqueous solution of potassium silicate having a specific gravity of about 1.267 and a purity of at least about 99.99%.

The water soluble salt is added as a precipitating agent for the silicate with the cation of the salt becoming the cation of the silicate which coats the phosphor. The preferred cations of the salt are zinc and magnesium. The water soluble salts are preferably zinc sulfate, zinc chloride, and magnesium sulfate which is preferably in either the anhydrous or the heptahydrate form, the criterion for choosing the salt being that of economics, convenience, and availability.

The resulting preferred coatings from the above preferred salts are therefore zinc silicate and magnesium silicate.

The silicon dioxide and the water soluble salt are added in amounts so that the silicon dioxide content of the coating makes up in percent by weight from about 0.05% to about 1.0% and preferably from about 0.1% to about 0.3% of the phosphor. If the coating level falls below about 0.05%, although there can still be hydrolysis resistance, the flow properties of the phosphor powder can be adversely affected. Therefore, in actual practice, the coating level is at least about 0.05%. Preferably the water soluble salt is added in an amount to give a weight ratio of from about 4 to 1 of the water soluble salt to the silicon dioxide. It has been found that this amount is generally sufficient to give the desired coating. It will be obvious to those skilled in the art how to compute these values. Some preferred relative amounts of silicon dioxide, water soluble salt, and phosphor will become apparent in the examples that ensue.

The resulting coated phosphor is then separated from the resulting liquor by any standard technique such as filtration.

The silicate coated phosphor is then heated at a sufficient temperature for a sufficient time in ambient atmosphere to remove essentially all of the water therefrom. Generally temperatures of from about 100° C. to about 150° C. and heating time periods of from about 1 hour to about 3 hours are sufficient to dry the phosphor. The resulting dried silicate coated phosphor is then heated at a sufficient temperature for a sufficient time to produce the final hydrolysis resistant phosphor. Heating temperatures are generally from about 400° C. to about 800° C. Heating time periods are generally from about 0.5 hours to about 3.0 hours. The heating is done in ambient atmosphere. Heating of this type of phosphor under these conditions generally further improves the hydrolysis resistance of the silicate coated phosphor.

The hydrolysis resistant rare earth oxysulfide phosphors of this invention, produced by the process of this invention consist essentially of a host which can be gadolinium oxysulfide, yttrium oxysulfide, gadolinium-yttrium oxysulfide, and lanthanum oxysulfide, from about 0.001 moles to about 0.10 moles, and preferably from about 0.001 moles to about 0.006 moles of terbium per mole of host as an activator, and a sufficient amount of a silicate coating to impart hydrolysis resistance to the phosphor.

The silicate coating can be an alkaline earth metal silicate or a transition group IIB metal silicate with zinc and magnesium silicates being especially preferred. The preferred hydrolysis resistant phosphors of this invention therefore are terbium activated gadolinium oxysulfide with a zinc silicate coating and terbium activated gadolinium oxysulfide with a magnesium silicate coating.

The $SiO_2$ content of the coating makes up generally in percent by weight from about 0.05% to about 1.0% and preferably from about 0.1% to about 0.3% of the phosphor, the amount of coating being sufficient to impart hydrolysis resistance to the phosphor.

The preferred use of these coated phosphors is as x-ray intensifier phosphors. By virtue of their resistance to hydrolysis, the screens which they make up can be continually used without noticeable degradation to the screen due to hydrolytic breakdown of the phosphor. To more fully illustrate this invention, the following non-limiting examples are presented. All parts, portions, and percentages are on a weight basis unless otherwise stated.

EXAMPLE 1

About 122.5 parts of terbium activated gadolinium oxysulfide phosphor is slurried in about 340 parts of deionized water. About 0.245 parts of $SiO_2$ are added as a potassium silicate solution to give a coating on the phosphor which makes up about 0.2% of the phosphor on a $SiO_2$ basis. The resulting solution is agitated for about 5 minutes after which time about 0.97 parts of $MgSO_4 \cdot 7H_2O$ are added. Agitation is continued for about an additional 5 minutes. The resulting slurry is then filtered and the resultant coated phosphor is dried for about 2 hours at about 150° C. The resulting dried coated phosphor powder is then transferred to a crucible and heated for about 2 hours at about 500° C. in ambient atmosphere. The resulting magnesium silicate coated phosphor is subjected to the following lead acetate paper test procedure. About 10 to about 20 grams of the coated phosphor is placed in a twenty milliliter glass vial with a screw cap closure. Several drops of water are added to the phosphor and a wetted lead acetate strip is placed across the mouth of the vial. The cap is then screwed tightly onto the vial and it is allowed to set for about 24 hours before it is opened. Upon removal, the lead acetate paper is examined for evidence of disoloration caused by the reaction of lead acetate and hydrogen sulfide vapor. There is no evident discoloration of the test paper indicating that the above coated phosphor is resistant to hydrolysis.

EXAMPLE 2

About 115 parts of terbium activated yttrium oxysulfide phosphor is slurried in about 320 parts of deionized water. To this slurry is added about 0.455 parts of $SiO_2$ as a potassium silicate solution to give a coating on the phosphor which makes up about 0.4% by weight of the coated phosphor on a $SiO_2$ basis and about 1.8 parts of $MgSO_4 \cdot 7H_2O$. The coated phosphor is obtained as described in Example 1. The magnesium silicate coated phosphor when subjected to the above described lead acetate paper test shows no discoloration indicating that it is hydrolysis resistant.

EXAMPLE 3

About 100 parts of terbium activated gadolinium oxysulfide is slurried in about 280 parts of deionized water. To this slurry is added about 0.200 parts of $SiO_2$ as a potassium silicate solution to give a coating on the phosphor which makes up about 0.2% by weight of the phosphor on a $SiO_2$ basis, and about 0.79 parts of anhydrous $ZnSO_4$. The procedure followed is the same as in Example 1. The resultant zinc silicate coated phosphor shows no discoloration of the lead acetate paper when tested.

EXAMPLE 4

A terbium activated gadolinium oxysulfide phosphor is coated with magnesium silicate to give varying $SiO_2$ contents and tested for hydrolysis by the lead acetate paper procedure. The visual results are given in Table 1 along with the results for a $SiO_3$ coated phosphor for purposes of comparison.

TABLE 1

| % $SiO_2$ | Coating | Lead Acetate Test Visual Results |
|---|---|---|
| 0.0 | None | Moderate Brown |
| 0.2 | Magnesium Silicate | White |
| 0.4 | " | " |
| 0.6 | " | " |
| 0.8 | " | " |
| 1.0 | " | " |
| 0.0 | None | Moderate Brown |
| 0.005 | Colloidal Silica | Very Dark |
| 0.10 | " | Dark |
| 0.20 | " | " |
| 0.60 | " | " |
| 1.00 | " | " |

Only the magnesium silicate coated material shows no discoloration of the test paper indicating no hydrolysis.

EXAMPLE 5

A terbium activated yttrium oxysulfide phosphor is coated with magnesium silicate to give varying $SiO_2$ contents and tested for hydrolysis by the lead acetate paper procedure. The results are given in Table 2.

TABLE 2

| % $SiO_2$ | Coating | Lead Acetate Test Visual Results |
| --- | --- | --- |
| 0.0 | None | Very Dark |
| 0.2 | Magnesium Silicate | White |
| 0.4 | " | " |
| 0.8 | " | " |

The samples which are coated show no noticeable hydrolysis as indicated by the white paper, whereas the uncoated sample shows hydrolysis as indicated by the dark paper.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for making a rare earth oxysulfide phosphor resistant to hydrolysis, said process comprising:
   (a) forming a slurry of said phosphor in water;
   (b) adding to said slurry a sufficient amount of a source of silicon dioxide and a water soluble salt selected from the group consisting of alkaline earth metal salts, and transition group IIB metal salts, with agitation for a sufficient time to form a silicate coating on said phosphor, the cation of said water soluble salt becoming the cation of said silicate coating, the amount of said silicate coating being sufficient to impart hydrolysis resistance to said phosphor;
   (c) separating the resulting silicate coated phosphor powder from the resulting liquor;
   (d) heating said silicate coated phosphor powder at from about 100° C. to about 150° C. for a sufficient time in ambient atmosphere to remove essentially all of the water therefrom; and
   (e) heating the resulting dried silicate coated phosphor powder at from about 400° C. to about 800° C. for a sufficient time in ambient atmosphere to produce the final hydrolysis resistant phosphor, said heating of the dried silicate coated phosphor powder effecting a phosphor exhibiting a greater hydrolysis resistance than said dried silicate coated phosphor powder absent this heating.

2. A process according to claim 1 wherein said phosphor consists essentially of a host selected from the group consisting of gadolinium oxysulfide, yttrium oxysulfide, gadolinium-yttrium oxysulfide, and lanthanum oxysulfide, and from about 0.001 moles to about 0.10 moles of terbium per mole of host as an activator.

3. A process according to claim 1 wherein said source of silicon dioxide is an aqueous solution of potassium silicate.

4. A process according to claim 1 wherein the water soluble salt is selected from the group consisting of magnesium and zinc salts.

5. A process according to claim 4 wherein said water soluble salt is selected from the group consisting of zinc sulfate, zinc chloride, anhydrous magnesium sulfate, and magnesium sulfate heptahydrate.

6. A process according to claim 1 wherein the silicate coating is selected from the group consisting of magnesium silicate and zinc silicate.

7. A process according to claim 1 wherein said silicate coated phosphor is heated for about 1.0 hours to about 3.0 hours to remove essentially all of the water therefrom.

8. A process according to claim 1 wherein the dried silicate coated phosphor is heated for about 0.5 hours to about 3.0 hours to produce the final hydrolysis resistant phosphor.

9. A process according to claim 1 wherein the silicate coating makes up from about 0.05% to about 1.0% by weight of the phosphor on a $SiO_2$ basis.

10. A process according to claim 1 wherein the hydrolysis resistant phosphor consists essentially of terbium activated gadolinium oxysulfide having a magnesium silicate coating.

11. A process according to claim 1 wherein the hydrolysis resistant phosphor consists essentially of terbium activated gadolinium oxysulfide having a zinc silicate coating.

* * * * *